United States Patent [19]
Parulski et al.

[11] Patent Number: 5,189,511
[45] Date of Patent: Feb. 23, 1993

[54] METHOD AND APPARATUS FOR IMPROVING THE COLOR RENDITION OF HARDCOPY IMAGES FROM ELECTRONIC CAMERAS

[75] Inventors: Kenneth A. Parulski; Donald C. Bellis, Jr., both of Rochester; Robert H. Hibbard, Fairport; Edward J. Giorgianni; Elizabeth McInerney, both of Rochester, all of N.Y.

[73] Assignee: Eastman Kodak Company, Rochester, N.Y.

[21] Appl. No.: 495,067

[22] Filed: Mar. 19, 1990

[51] Int. Cl.$^5$ .............................................. G03F 3/08
[52] U.S. Cl. ........................................ 358/80; 358/76
[58] Field of Search ..................................... 358/76, 80

[56] References Cited

U.S. PATENT DOCUMENTS

| | | | |
|---|---|---|---|
| 3,801,736 | 4/1974 | Kosaka et al. | 178/5.2 A |
| 4,397,545 | 8/1983 | Terashita | 355/77 |
| 4,409,614 | 10/1983 | Eichler et al. | 358/76 |
| 4,679,072 | 7/1987 | Takayama | 358/80 |
| 4,780,762 | 10/1988 | Nagasaki | 358/166 |
| 4,982,277 | 1/1991 | Katoh et al. | 358/80 |
| 5,045,933 | 9/1991 | Tatsumi | 358/80 |
| 5,049,985 | 9/1991 | Outa | 358/80 |

FOREIGN PATENT DOCUMENTS 2194706 3/1988 United Kingdom .

OTHER PUBLICATIONS

The Theory of the Photographic Process, 4th edition, "Tone and Color Reproduction" pp. 536–577.
Karel Staes, SMPTE Journal, vol. 87, Sep. 1978, "The Role of Film in the Film–Plus–Telecine System: Considerations About Telecine Design", pp. 565–573.
Eduard Wagensonner, "Architecture of a Digital Scanner Printer System for Colour Images" (no date).
Principles of Color Television, The Hazeltine Laboratories Staff (no date).
LeRoy E. DeMarch and Edward J. Giorgianni, Physics Today, Sep. 1989, "Color Science For Imaging Systems", pp. 44–52.
Mr. L. E. DeMarsh, Color: Theory & Imaging Systems, "Color Reproduction in Color Television" pp. 184–207 (no date).
R. H. McMann, Jr. and A. A. Goldberg, Journal of the SMPTE, vol. 77, Mar. 1968, "Improved Signal Processing Techniques for Color Television Broadcasting", pp. 221–228.

(List continued on next page.)

Primary Examiner—Leo H. Boudreau
Attorney, Agent, or Firm—Edward Dugas

[57] ABSTRACT

The present invention involves taking a three color signal produced by an electronic color image sensor, such as the Kodak KAF-1400 sensor with a 3G CFA filter, and performing additive-type color correction processing in a linear domain suitable for performing additive-type color correction. The additive-type processing can be performed by a matrix multiplier using three 3 element correction equations. The linear color corrected signals are converted into a domain, such as the log domain, suitable for performing subtractive-type color correction. Subtractive-type color correction is performed using three 3 element correction equations, or three 9 element correction equations. The color corrected sigtnals are then converted to an appropriate format for input to a color printer. To reduce noise enhancement problems, the color correction is performed on lowpass color signals, and the color corrected lowpass signals are combined with the original high frequency color signals. To enhance the sharpness of the color print, edge enhancement is performed in a three color enhancement space using an appropriately quantized and filtered green color signal, and coring and clipping type noise removal.

7 Claims, 6 Drawing Sheets

OTHER PUBLICATIONS

Leroy E. DeMarsh, IEEE Transactions on Consumer Electronics, May 1977, "Color Rendition in Television", pp. 149-157.

R. W. G. Hunt (Fellow), I. T. Pitt, P. C. Ward, The Journal of Photographic Science, vol. 17, 1969, "The Tone Reproduction of Colour Photographic Materials" pp. 198-204.

R. W. G. Hunt, British Kinematography, Sound and Television Journal, "The Effect of Viewing Conditions on Required Tone Characteristics in Colour Photography", pp. 1-8 (no date).

Kenneth A. Parulski, IEEE Transactions on Electron Devices, vol. ED-32, No. 8, Aug. 1985, "Color Filters and Processing Alternatives for One-Chip Cameras", pp. 1381-1389.

Michael Kriss, Ken Parulski, David Lewis, Proceedings, SPIE vol. 1082, Applications of Electronic Imaging (1989) "Critical technologies for electronic still imaging systems", pp. 157-184.

K. A. Parulski, L. J. D'Luna, R. H. Hibbard, IEEE Transactions on Consumer Electronics, vol. 35, No. 3, Aug. 1989, "A Digital Color CCD Imaging System Using Custom CLSI Circuits", pp. 382-388.

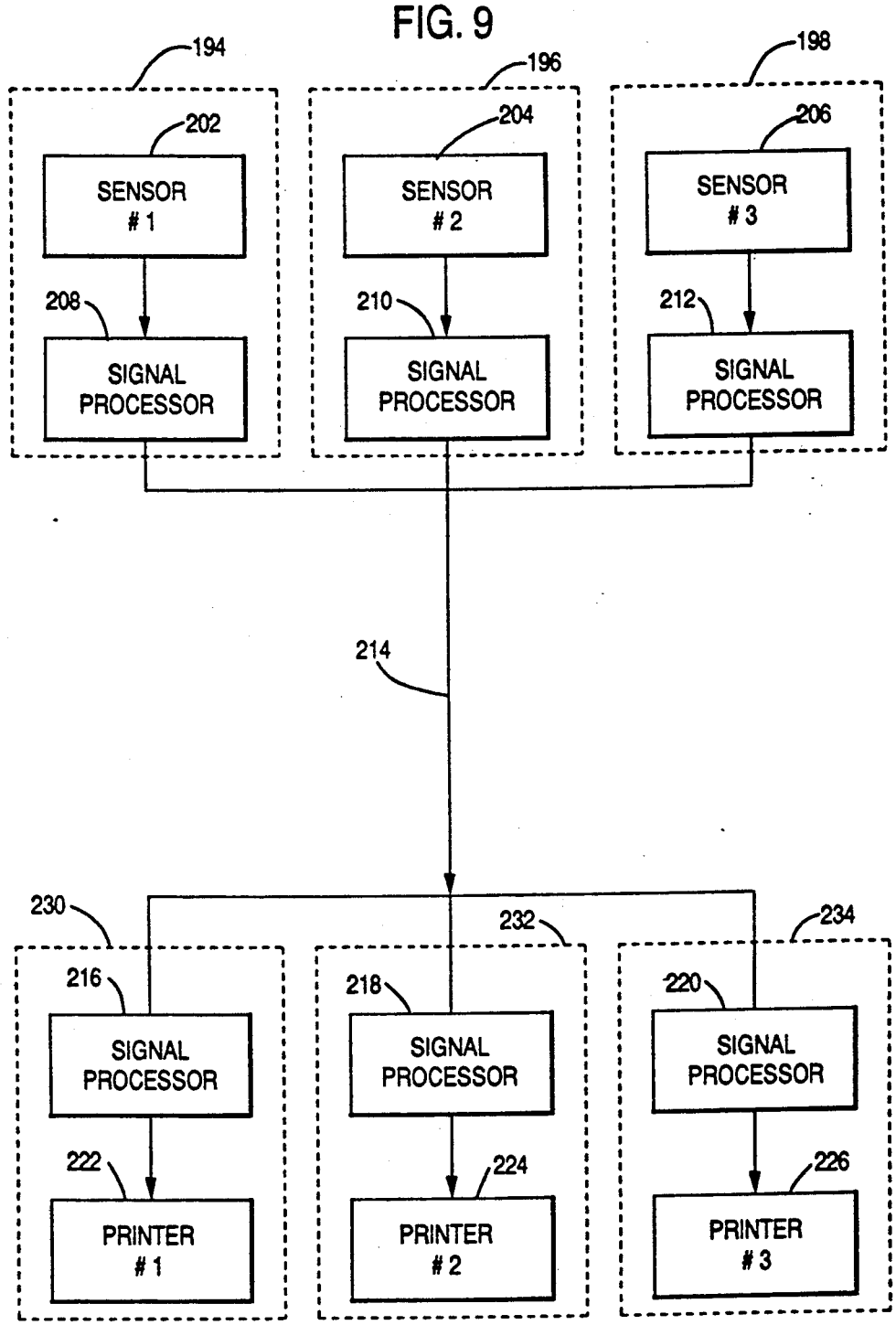

METHOD AND APPARATUS FOR IMPROVING THE COLOR RENDITION OF HARDCOPY IMAGES FROM ELECTRONIC CAMERAS

CROSS REFERENCES TO RELATED APPLICATIONS

This application is related to U.S. applications Ser. No. 07/208,302 filed Jun. 17, 1988 now U.S. Pat. No. 4,896,207 and Ser. No. 07/346,861 filed May 3, 1989, now U.S. Pat. No. 5,001,663, Ser. No. 07/310,456 filed Feb. 13, 1989 now U.S. Pat. No. 4,962,419 and Ser. No. 07/388,451 filed Aug. 2, 1989 now U.S. Pat. No. 5,053,866, all incorporated by reference herein.

BACKGROUND OF THE INVENTION

1. Field of the Invention

The present invention relates to color image reproduction apparatus and associated methods. More particularly, the invention relates to an imaging system that produces hardcopy images from scenes captured by an electronic camera, and which provides signal processing to improve the color rendition and image quality of the hardcopy images.

2. Description of the Related Art

The two fundamental methods of producing color images are the subtractive method and the additive method. In the subtractive method, image dyes are used to modulate, by absorption, the transmitted or reflected light of the viewing illuminant. In the silver-halide-based photographic system, for example, cyan, magenta and yellow image dyes are used to modulate red, green, and blue light, respectively. In the additive method, modulated intensities of (typically red, green, and blue) lights, known as primaries, are combined to form the color image. One example of a system using the additive method is color television. In this system, the image is typically displayed on a cathode ray tube (CRT). The image on the CRT is produced by modulating the intensities of red, green and blue light-emitting phosphors. The phosphors are therefore the primaries of the system. The signals which modulate the CRT are derived from a set of three linear color image-bearing signals which are typically produced in a television camera using tube or charge coupled device (CCD) sensors. The linear camera signals vary in linear proportion to the sensor exposure levels. For example, if the sensor exposure doubles, the level of the linear signal doubles.

Additive color theory shows that a set of ideal camera spectral sensitivities, called color-matching functions, can be determined based on the primaries of the system. If a camera could be produced with these spectral sensitivities, no further color correction would be required. It can be shown, however, that color-matching functions of any set of realizable primaries will contain negative values, corresponding to areas of negative spectral sensitivity. In practice, then, some electronic signal processing is used to improve color reproduction. The color correction appropriate for such systems is called additive-type color correction. Typically, the linear red, green and blue image-bearing signals in the color camera are linearly combined to form modified red, green, and blue image-bearing signals in such a way as to improve the color reproduction of the CRT display. Both additive color theory and the type of additive color correction used in television systems are discussed in detail in such texts as Principles Of Color Television, John Wiley and Sons, Inc., 1956, incorporated by reference herein.

In the subtractive color photographic system, the displayed photographic image is produced by cyan, magneta, and yellow image dyes. The amounts of the image dyes in the displayed image are based on the exposures originally recorded, as a latent image, by the light-sensitive emulsions of the camera film. In existing subtractive systems, the primaries can be referred to as "unstable"; in that changes in the dye concentration of a single dye result in changes in chromaticity. Therefore, unlike the additive system, unique primaries for such systems cannot be determined and thus no set of corresponding color-matching functions can be associated with the set of image dyes. As a result, the color correction appropriate for this type of system is complex. In typical photographic systems, color correction is provided by interlayer interimage effects which adjust the formation of cyan, magenta, and yellow dyes. Due to the nature of the photographic system, these interlayer interimage effects produce adjustments that are non-linearly related to the exposures recorded in the latent image. This type of color correction, which we will refer to as subtractive-type correction, is discussed in detail in such texts as The Theory Of The Photographic Process, MacMillian Publishing Co., Inc. 1977 incorporated by reference herein.

Color imaging systems have been developed which utilize both additive and subtractive elements. For example, telecine systems have been proposed to convert color film images into color television signals. Telecine systems are discussed in The Roll Of Film In The Film-Plus-Telecine System: Considerations About Telecine Design, SMPTE Journal, Vol. 87, September 1978. The appropriate color processing for a telecine would include subtractive-type processing, to correct for the characteristics of the film, followed by additive-type processing, to correct for the characteristics of the television system.

A fundamentally different type of color imaging system which combines both additive and subtractive elements is electronic still photography. In such a system, images are captured using electronic cameras similar to television cameras and viewed on a video display, however, the resulting signals can be used to produce hardcopy images. Presently available electronic photography systems use the still video floppy recording standard and produce "video-quality" images. In this type of system, the output is optimized for presentation on the video display and the video optimized signals are applied directly (without modification) to the hard copy device. The video quality images may be acceptable for today's video display, but prints from still video floppy systems are poor in image resolution and color rendition compared to prints from consumer 35 mm cameras.

To produce a higher quality electronic still photography system, both the resolution and the color reproduction of the hardcopy images must be improved. This invention describes unique signal processing which improves the color reproduction by using a novel method of subtractive-type color processing which attempts to stabilize the primaries associated with the image dyes used to produce the hard copy images, preceded by additive-type processing which attempts to correct the camera sensitivities appropriately for the stabilized primaries. The signal processing further improves the image quality of the hard copy images by performing edge enhancement in parallel with the color correction operations in such a way as to minimize the introduction of undesirable noise and artifacts.

SUMMARY OF THE INVENTION

In view of the foregoing, it is an object of the present invention to provide an improved color imaging system.

It is a further object of the present invention to provide methods and means for improved signal processing in a color imaging system.

It is also an object of the present invention to provide a system which will combine additive-type followed by subtractive-type processing operations while performing the processing operations in suitable processing domains.

It is another object of the present invention to provide a system which will convert a scene captured electronically into a color hardcopy image.

It is a further object of the present invention to provide color signal processing that attempts to stabilize the subtractive primaries of the hardcopy media and correct for the spectral sensitivities of the electronic sensor that captures a scene.

It is also an object of the present invention to provide edge enhancement in a processing system incorporating both additive-type and subtractive-type color processing.

The present invention accomplishes the above objects by taking the three color signals produced by an electronic color image sensing means and performing additive-type color correction processing in a domain suitable for correcting additive color signals, converting the linear corrected signals into a domain suitable for performing subtractive-type color correction, performing subtractive color correction processing and providing the corrected signals to a color printer. To further enhance the quality of the hardcopy image, edge enhancement is performed on a transformed green color signal derived prior to the color correction processing.

These improvements together with other objects and advantages which will be subsequentially apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 9 illustrates a second system for converting images captured by different sensors into prints by different printers.

DESCRIPTION OF THE PREFERRED EMBODIMENTS

In the present invention, a scene, which can be a live scene or a scene fixed on a tangible medium such as a color print, is captured by a color image sensing and signal processing unit 12, processed by a color processing unit 14, and supplied to a hardcopy printer 16 which produces a color print 18 directly on photographic or thermal print media.

Figure 7:
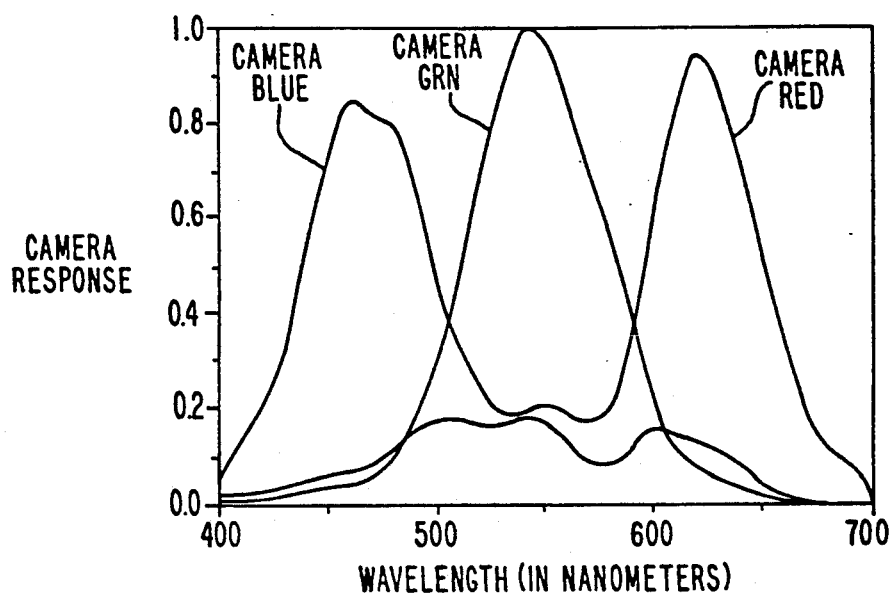
FIG. 7 is a graph of the effective responsitivities of the red, green, and blue photosites of the preferred embodiment of the image sensing means.

The color image sensing and signal processing unit 12 is preferably a color camera with a single megapixel sensor such as the Kodak KAF-1400 sensor which is a frame transfer charge coupled device (CCD) imager with 1035 active vertical photosites and 1320 active horizontal photosites. The sensor plane image is formed with an appropriate lens such as a 25 mm Kodak Cine-Ektar lens. It is preferred that the sensor include a color filter array (CFA) such as the Kodak 3G CFA which is formed by depositing color dyes on the photosites of the CCD image sensor to form red, green, and blue photosites. An infrared block filter, preferably a model BG-39 filter made by Schott Optical Glass, Inc., Duryea, Pa., is preferably positioned between the lens and the image sensor. The effective red, green, and blue responsitivities of the lens-filters-sensor combination are shown in FIG. 7. The unit 12 includes the appropriate amplifiers and analog to digital converters necessary to produce linearly quantized conventional tri-color red, green, and blue (RGB) signals. The unit 12 could alternately be a conventional three tube or three CCD color camera which produces digital tri-color signals.

The color processing unit 14 is preferably a general purpose computer such as a SUN 3/280 computer or an Apple Macintosh II family personal computer. A general purpose computer is convenient because it will allow the color processing unit 14 to be easily reconfigured for different types of sensing units 12 and printers 16 as will be discussed in more detail with respect to FIG. 6. However, as discussed later herein, an appropriate hardwired unit 14 can be constructed from components such as matrix multipliers and memories if speed and/or size is important. The color processing unit 14 could also be part of the color camera 12, part of the printer 16, could be split between both the camera and printer, or could be provided in a separate unit which could interface to a number of different cameras and a number of different printers.

The preferred hardcopy printer is a Kodak XL-7700 printer, and the print media 18 is preferably Kodak Electronic Print paper, although other types of printers or media are suitable substitutes.

The color processing unit 14 performs three major functions for converting the electronic image into suitable signals for producing a high-quality color print.

The first step or function is additive-type color correction processing 20 which alters the effective camera sensitivities to better match the theoretical color-matching functions corresponding to the primaries associated with the imaging dye set of a hardcopy medium. This type of processing, 20, is performed in a linear space (the linear space of the sensor) using color correction formulas as set forth in equations 1–3:

$$Ra = a11R + a12G + a13B \qquad (1)$$

$$Ga = a21R + a22G + a23B \quad (2)$$

$$Ba = a31R + a32G + a33B \quad (3)$$

where R, G and B are the digital tri-color signal values for each pixel from unit 12, Ra, Ga and Ba are the color corrected RGB signals, and the constants anm of equations 1-3 are set forth in the matrix table 1 set forth below:

MATRIX TABLE 1

| anm | m=1 | m=2 | m=3 |
|---|---|---|---|
| n 1 | 1.573 | −0.347 | −0.226 |
| n 2 | 0.103 | 0.880 | 0.018 |
| n 3 | −0.059 | 0.020 | 1.038 |

A different set of constants would be used if the system employed other camera sensitivities or image forming dyes. If the camera sensitivities are not a linear combination of the theoretical color matching functions associated with the imaging dyes, it may be advantageous to perform the additive color correction using higher ordered equations. As can be seen from the above arrangement of the equations in matrix form, arithmetic matrix operations are preferably the way in which the additive color corrected digital signals are produced. If the present invention is implemented in a hardwired version rather than in a general purpose processor, a matrix multiplication circuit or unit such as disclosed in U.S. application Ser. No. 07/346,861 is preferred. It is of course possible to replace the operations of the computer or matrix multiplier with a three dimensional table look-up unit such as a ROM (Read Only Memory). Such a memory would use the input RGB data as addresses to color corrected values stored in the memory.

Figure 1:
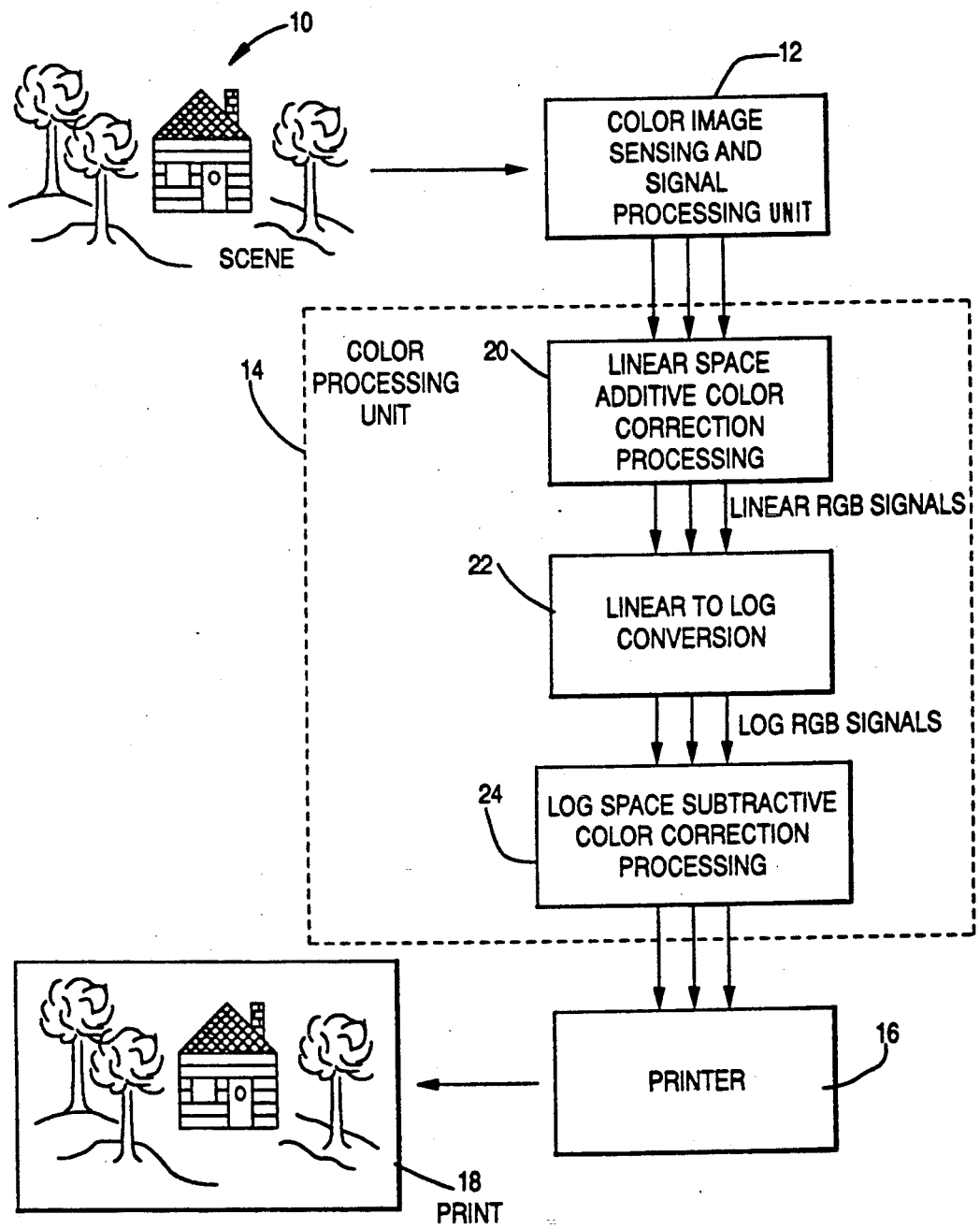
FIG. 1 is a simplified block diagram of the present invention.
Figure 2:
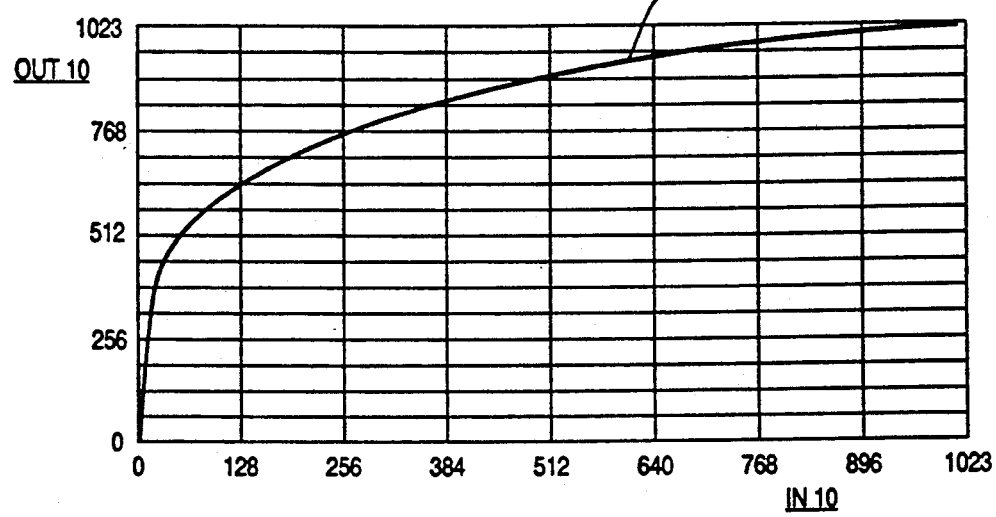
FIG. 2 is a graph used for linear to log conversion.

The color correction processing 20 produces linear color signals that must be converted 22 from an additive-type processing space or domain to a space appropriate for subtractive-type color correction processing. In the preferred embodiment, this is accomplished using formulas such as set forth in equations 4 and 5:

$$OUT_{10} = (IN_{10} \times 16) \text{ for } IN_{10} < 12 \quad (4)$$

$$OUT_{10} = (1023/\log_{10} 255) \times \log_{10}(((25 - 4 \times IN_{10})/1023) + 1) \text{ for } IN_{10} \geq 12 \quad (5)$$

where IN is the input color data value and OUT is the output color data value. Equations 4 and 5 are suitable for 10 bit linear to 10 bit logarithmic conversion over a dynamic range of 255:1. Because the slope of linear to log transformations at very low values is steep, two equations are used to avoid large steps at low digital signal values. When speed is of the essence it is also possible to provide a lookup table type conversion unit for the range of possible values, which will result in a table with the relationships between input and output shown in FIG. 2. This table (preferably a ROM) would have stored $OUT_{10}$ values with the value $IN_{10}$ being the index or address applied to the ROM.

Once the color signals are converted 22 into the log domain, the third step is log space subtractive-type color correction processing 24 which attempts to stabilize the primaries associated with the image dyes used to form the print. The subtractive-type processing 24 is performed in accordance with equations 6, 7 and 8 below:

$$Rs = s11Ra + s12Ga + s13Ba \quad (6)$$

$$Gs = s21Ra + s22Ga + s23Ba \quad (7)$$

$$Bs = s31Ra + s32Ga + s33Ba \quad (8)$$

where Ra, Ga and Ba are the linear to log converted values from the additive-type correction output, Rs, Gs and Bs are the output color signals from the subtractive-type correction, and snm are constants as set forth in matrix table 2 below:

MATRIX TABLE 2

| snm | m=1 | m=2 | m=3 |
|---|---|---|---|
| n 1 | 1.414 | −0.463 | 0.049 |
| n 2 | −0.820 | 2.623 | −0.803 |
| n 3 | 0.138 | −1.258 | 2.120 |

A different set of constants would be used if the system employed other camera sensitivities or image forming dyes. In like manner as described above it is preferable that matrix arithmetic be used in executing equations 9-11 and if a hardwired circuit or unit is implemented that the implementation be in accordance with the circuit described in U.S. application Ser. No. 07/346,861. Once again, a ROM three-dimensional look-up table could be used. It is also possible to perform the log color correction processing using higher order equations such as equations 9-11:

$$Rs = s11Ra + s12Ga + s13Ba + s14Ra^2 + s15RaGa + s16RaBa \quad (9)$$

$$Gs = s21Ra + s22Ga + s23Ba + s24Ga^2 + s25GaRa + s26GaBa \quad (10)$$

$$Bs = s31Ra + s32Ga + s33Ba + s34Ba^2 + s35BaRa + s36BaGa \quad (11)$$

where Ra, Ga and Ba are the linear to log converted values from the additive-type correction output, Rs, Gs and Bs are the output color signals from the subtractive-type correction, and snm are constants as set forth in matrix table 3 below:

MATRIX TABLE 3

| snm | 1 | 2 | 3 | 4 | 5 | 6 |
|---|---|---|---|---|---|---|
| n1 | 1.060 | −.033 | −0.027 | .169 | −0.204 | 0.036 |
| 2 | −0.638 | 1.632 | 0.006 | .515 | −0.088 | −0.427 |
| 3 | −0.043 | 0.032 | 1.011 | .622 | 0.093 | −.0715 |

Once again the constants would be different if the system employed other sensitivities and dyes. The subtractive-type color correction provided by using higher order equations such as equations 9-11 generally provides some further improvement in color reproduction, compared to using the subtractive-type color correction provided by equations 6-8, but is more complex to implement. In general, it is advantageous to use higher order equations if the print material being used has unwanted non-linear interlayer interimage effects. It may also be advantageous to use the higher order equations for the subtractive-type color correction in a system in which the camera sensitivities are not linear combinations of the theoretical color matching functions associated with the imaging dyes and in which only a 3 by 3 matrix has been used for the implementation of the additive-type color correction. Higher order processing in the additive-type color correction is also possible.

The output of the subtractive color correction processing 24 is converted into the proper format and metric required by the printer 16. If the printer produces a print image with a greater or lesser number of pixels than provided by the color sensor of the unit 12, the output must be converted to have the correct number of pixels and the correct orientation for the printer. This can be done using well-known image interpolation and image rotation techniques.

In the color processing operations, both the additive-type and subtractive-type arithmetic operations can be increased in speed by processing with fewer than the 9 terms used in the equations 1-3 and 6-8, with some slight decrease in color reproduction quality, by eliminating the matrix terms which are nearly zero, for example, by setting either or both the a23 term of matrix table 1 or the s13 term of matrix table 2 to zero and eliminating those terms from the computations.

Figure 3:
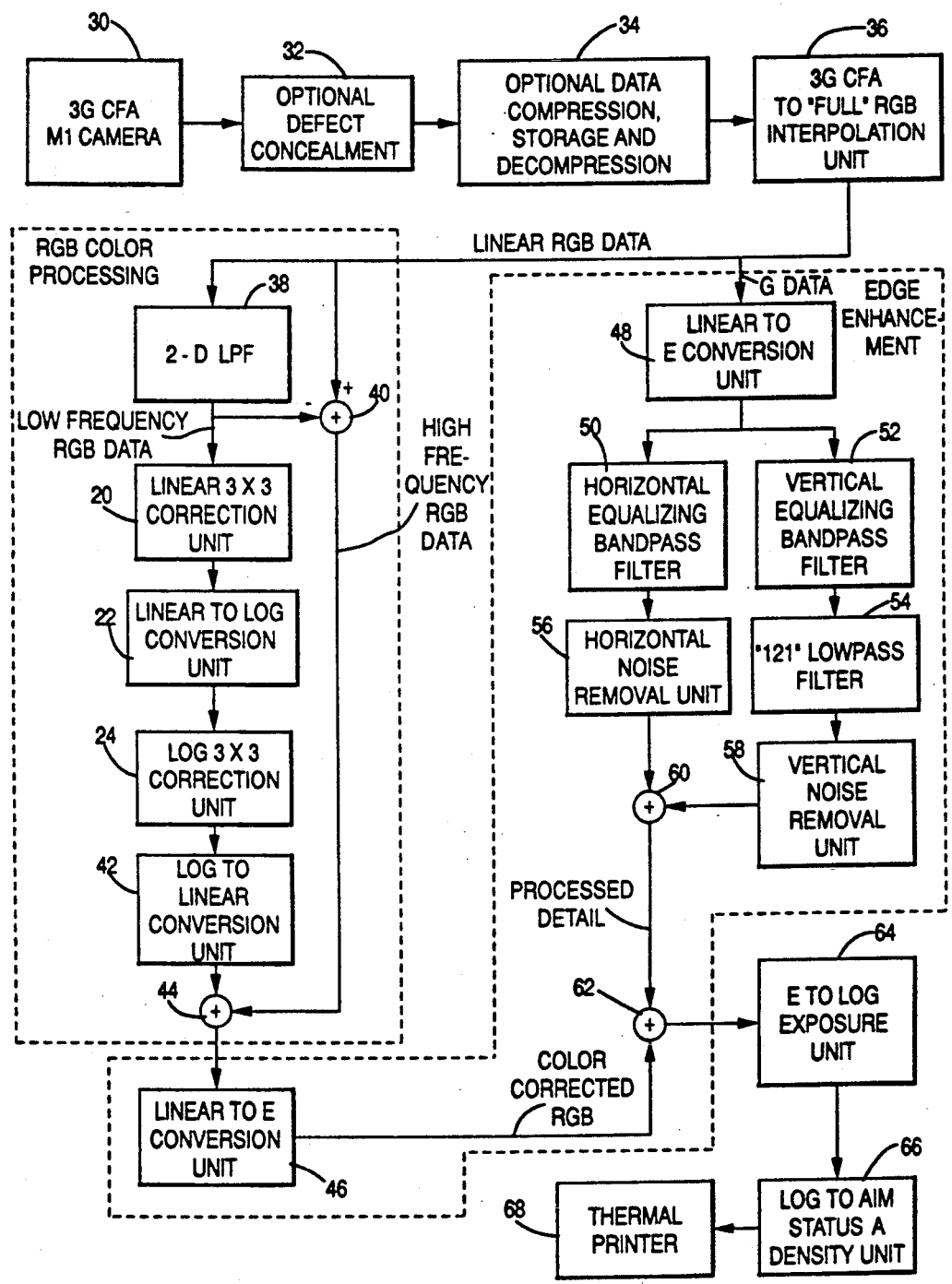
FIG. 3 depicts the detailed processing steps of a preferred embodiment of the present invention.

The preferred embodiment of the present invention also incorporates edge enhancement processing as illustrated in FIG. 3. Electronic edge enhancement is a process which boosts the amplitude of the high spatial frequencies in the image. It is similar to photographic unsharp masking techniques used in graphic arts, but is much more flexible and controllable. There are different types of edge enhancement algorithms which vary in performance and complexity and the preferred edge enhancement procedure will be discussed in more detail with respect to FIG. 3.

As illustrated in FIG. 3, the camera 30 produces tricolor data which can be processed by an optional defect concealment algorithm or unit 32 which, for example, averages the two closest non-defective horizontal pixels of the same color and substitutes the average for the defective pixel values, and through an optional data compression storage and decompression unit 34. If the preferred Kodak 3G CFA is used, the sparsely-sampled red, green and blue image records must undergo interpolation to produce complete red, green, and blue image records in the interpolation unit 36. The details of the processing associated with a 3G CFA for producing the full RGB image data are discussed in U.S. Pat. Nos. 3,971,065; 4,605,956; and 4,663,661 and U.S. application Ser. No. 07/208,302 filed Jun. 17, 1988 and incorporated by reference herein. The result of the interpolation is three complete image records of linear RGB data. In general, the digital processing steps used to interpolate the missing RGB pixels are: 1. Interpolate the missing green pixels in linear space using a symmetric vertical FIR filter with tap weights (0.21, −0.55, 0.84, ×0.84, −0.55, 0.21) where × indicates the vertical location of the missing green pixel. 2. Convert the RGB values from linear to log space and calculate the hue values at the missing green pixel locations where the hue values are (log R − log $G_{missing}$) and (log B − log $G_{missing}$). Linearly interpolate the missing hue values and add the log G values at the interpolated hue locations to calculate interpolated log R and log B values for the missing red and blue pixels. 3. Convert the log R, log G, and log B signals back to linear space.

Since electronic color processing typically increases noise, the color processing is done on a low pass filtered version of the image. The coefficients for the two dimensional 9 tap finite impulse response (FIR) filter operation 38 for both horizontal and vertical are preferably (0.0375, 0.089644, 0.125, 0.160355, 0.175, 0.160355, 0.125, 0.89644, 0.375) though other low pass filters can be used. The low pass filtered signals are inverted and added to the unfiltered RGB data by an adder 40 to produce high frequency RGB data. Once the low pass filtered RGB data has been linearly corrected 20, converted into the log domain 22, corrected in the log domain 24 and converted back to the linear domain 42 using the inverse of equations 7 and 8, the high frequency RGB data is combined with the color corrected RGB data by an adder 44. Next, the linear RGB data is converted 46 into an enhancement space using equations 12 and 13:

$$OUT10 = 0.07787 * IN10 \text{ for } IN10 < 9 \quad (12)$$

$$OUT10 = 1023 * ((1.16 * (IN10/1023)^{**}0.33) - 0.16) \text{ for } IN10 >= 9 \quad (13)$$

where IN10 is each of the individual RGB color corrected data values from adder 44, and OUT10 is the corresponding output RGB signal value from the enhancement space converter 46. Equations 12 and 13 are based on the CIELAB L*space equation described in CIE Publication 15, "Colorimetry", 1971 incorporated by reference herein.

Figure 4:
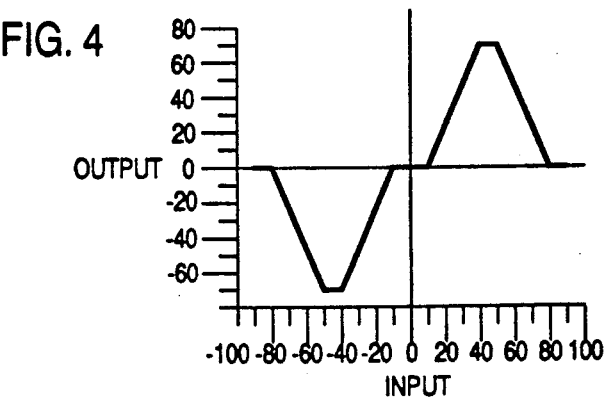
FIG. 4 illustrates the noise removal curve used to remove noise from the edge enhanced data.

The green data separated out of the linear RGB data from the interpolator 36 is also converted 48 into the enhancement space using the same equation. The preferred edge enhancement algorithm uses separable horizontal and vertical filters to produce horizontal and vertical detail signals. Other more sophisticated edge enhancement and noise reduction techniques can of course be used. In the preferred process, detail signal filters are designed to correct the modulation transfer function (MTF) of the electronic system to be approximately unity up to about half the sensor Nyquist frequency and then roll off gradually to zero at the Nyquist frequency. The first step is to separately perform horizontal 50 and vertical 52 equalizing bandpass filtering. When producing 3.0×5.0 inch prints, both the horizontal and vertical FIR filter coefficients can be set to (−0.088, 0.196, −0.575, 0.054, 1.825, 0.054, −0.575, 0.196, −0.088) and if 8.0×10.0 inch prints are produced, both the horizontal and vertical FIR filter coefficients can be set to (−0.150, 0.266, −0.450, −0.016, 1.700, −0.016, −0.450, 0.266, −0.150). The vertical signal is then low pass filtered 54 in the horizontal direction using an FIR filter with coefficients (0.25, 0.5, 0.25). This filtering prevents diagonal spatial frequencies from being doubly-enhanced. Before the horizontal and vertical signals are recombined, horizontal 56 and vertical 58 noise removal operations are performed. This operation is known as coring and clipping where coring is an operation in which very small detail signals are set equal to zero, since they are probably noise, and clipping involves limiting large signal details to a small value to prevent large edge transitions from looking unnatural. The noise removal operation is preferably performed using a lookup table programmed in accordance with the clipping and coring function illustrated in FIG. 4 and discussed in more detail in the related application having U.S. Ser. No. 07/310,456. Once the noise created by the edge enhancement of the green data is removed, the vertical and horizontal components are combined using an adder 60. The adder 60 produces a single edge enhancement signal which is combined by adder 62 with each of the RGB data signals. The final processing step is to convert the RGB data signal outputs from adder 62 into a data metric appropriate for interfacing to the printer. In this preferred embodiment, the RGB enhancement data is first converted 64 into log exposure values using an equation which is equivalent to applying equations 4-5 to the output of the inverse of equations 12-13, or using a lookup table programmed in accordance with these equations.

Figure 5:
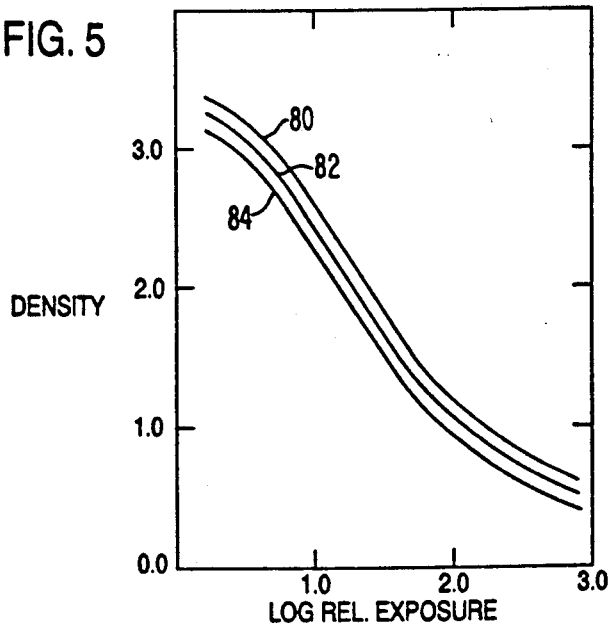
FIG. 5 is a conversion curve for converting from log exposure to density.
Figure 8:
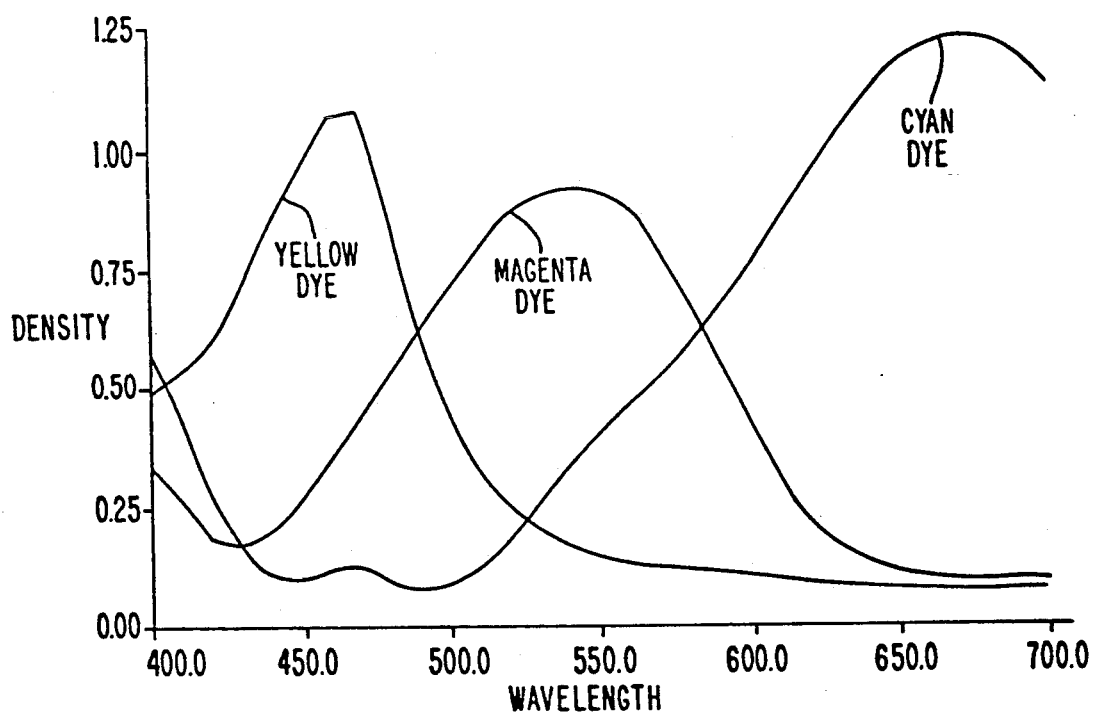
FIG. 8 is a graph of the spectral dye densities of the cyan, magneta and yellow dyes at the preferred embodiment of the image printing means.

The log exposure values are converted 66 into density values suitable for the print media being used by printer 68. This can be accomplished using lookup tables which performs a conversion in accordance with the conversion curves 80, 82 and 84 as illustrated in FIG. 5, or appropriate equations can be used for the conversion. The look-up tables for curves 80, 82 and 84 for this conversion correspond to the red, green and blue (respectively) density versus log relative exposure curves appropriate for reproduction on the Kodak Electronic Print film of the preferred embodiment. The RGB output values from converter 66 are presented to the inputs of printer 68, which is calibrated according to the teachings of U.S. application Ser. No. 07/388,451. The print is produced using cyan, magenta, and yellow dyes having the spectral densities shown in FIG. 8.

Because the present invention is preferably implemented in a computer, care must be taken to make sure that the appropriate portions of the image are correspondingly processed. If the captured image is considered to have i and j indices corresponding to the two dimensional sensor pixels, then at each processing stage the corresponding indices should be used. For example, the correctly indexed color corrected value should be combined with the correct color enhancement value from adder 60.

Figure 6:
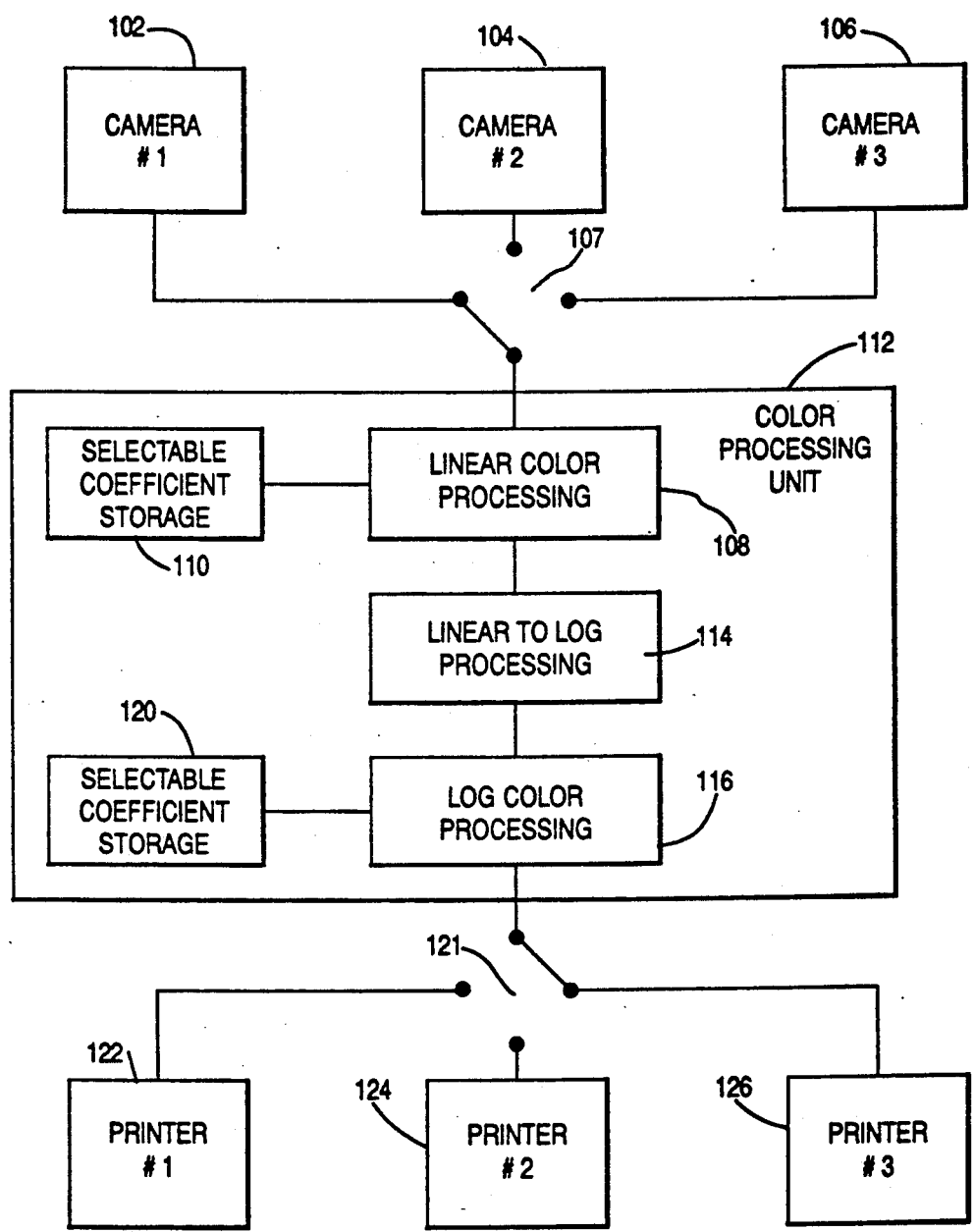
FIG. 6 illustrates a system for converting images captured by different cameras into prints by different format printers.

An adaptive system capable of handling many different types of cameras and many different types of hardcopy devices and media is illustrated in FIG. 6. In this embodiment of the invention, each color camera 102, 104 and 106 utilizes the same linear additive-type color correction block 108 in the unit 112, which is programmed with the matrix co-efficient set stored in selectable storage 110 appropriate for the camera 102, 104 and 106, and the printer 122, 124 and 126 used. That is, the storage 110 contains nine groups of coefficients divided into sets of three, each set corresponds to a camera and is used when the corresponding camera is selected by a device such as switch 107. The switch 107 could, of course, be implemented in software and be, for example, a file retrieval or communication program that obtains the picture data for the corresponding camera. The storage 110 could be magnetic (disk) or electronic (RAM) memory which is accessible by a control program or could be a switched device such as a ROM. A single domain conversion block 114 for converting from the linear to log domains supplies the converted data to a subtractive-type color correction block 116, which is programmed with the matrix coefficient set in storage 120 appropriate for the camera 102, 104 and 106 and the printer 122, 124 and 126 and media used. This storage 120 also holds nine groups of coefficients divided into three sets corresponding to the printers and should be of the same type as storage 110. Of course, the blocks 108, 114 and 116 perform the operations previously described and could be hardware such as matrix multipliers or software running in a computer. This system can provide proper color correction for images from various different cameras, produced using various different printers and print media.

A second system capable of handling many different types of cameras and many different types of hardcopy devices is shown in FIG. 9. In this embodiment, the color correction processing is divided between the cameras, 194, 196 and 198 and the printing units 230, 232 and 234. In this embodiment each of the color sensors 202, 204 and 206 has a corresponding additive color correction processor 208, 210 and 212. Each of the printers 222, 224 and 226 also has a corresponding subtractive color correction processor 216, 218 and 220. The domain conversion processing could reside in either the processors 208, 210 and 212 on the camera side or in the processors 216, 218 and 220 on the printing unit side. By providing such an arrangement the signal transmitted over line 214 can be standardized. This allows units such as shown in FIGS. 6 to operate with any camera, printer and media. By dividing the color correction processing as discussed above, optimum color processing can be used for each individual camera and hardcopy output device. Proper processing of the signals by each camera ensures that all camera output signals conform to those of a defined reference camera. Proper processing of the signals received by each output device ensures that each device achieves optimum color reproduction from signals corresponding to those provided by the defined reference camera. This arrangement allows signals from different types of cameras to provide input to different types of hardcopy devices and media.

The systems described in the preferred embodiments are capable of producing high quality color images, significantly improved relative to known prior art electronic still photography systems. Comparable results can typically be achieved for cameras having spectral sensitivities which differ from those shown in FIG. 7, if appropriate adjustments are made to matrix table 1. The overall accuracy of the color reproduction of the system will depend, in part, on the degree to which the spectral sensitivities correspond to a set of color-matching functions. In cases where the camera sensitivities are not linearly related to a set of color-matching functions, it may be advantageous to use higher-order equations similar to equations 9-11, in place of equations 1-3, to perform the additive-type color correction. Comparable results can also be achieved for different printers or hardcopy media if appropriate adjustments are made to matrix table 2 or table 3 and conversion unit 66 of FIG. 3. The gamut of reproducible colors will, of course, be limited by the gamut of the imaging dyes of the hardcopy medium.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to falling within the scope of the invention. For example the disclosure has indicated that only the green data is subjected to edge enhancement processing and this signal is then combined with all three of the red, green, blue data signals. The green data was selected for the edge enhancement because in a camera using the 3G CFA, the green signal carries most of the actual image detail and the red and blue signals are primarily interpolated signals. It is possible, if a three sensor camera is used and if sufficient processing speed and memory capacity is available, for all three color signals to be used for edge enhancement. Of course, a separate luminance channel could instead be used for edge enhancement. The invention has been described with respect to additive-type color correction being performed in a linear domain and subtractive-type color correction being performed in a log domain. It is possible to perform the additive-type and subtractive-type processing in other domains. For example, with appropriate conversion, the subtractive-type processing can be performed in a linear domain such as the domain used for edge enhancement, as defined in equations (12) and (13). While the preferred embodiments have been described in relation to the production of print images, it is also possible to use the methods disclosed to produce images on film for either direct viewing or photographic printing.

We claim:

1. An apparatus for converting an image into a color print, comprising:
   a color camera producing RGB data;
   a two dimensional lowpass filter connected to said camera;
   a linear correction unit connected to said two dimensional low pass filter;
   a log conversion unit connected to said linear correction unit;
   a log correction unit connected to said log conversion unit;
   a linear conversion unit connected to said log correction unit;
   a first adder connected to said sensor and said two dimensional lowpass filter;
   a second adder connected to said linear conversion unit and said second adder;
   a first enhancement conversion unit connected to said camera;
   a vertical bandpass filter connected to said first enhancement conversion unit;
   a second low pass filter connected to said vertical band pass filter;
   a vertical noise removal unit connected to said second low pass filter;
   a horizontal bandpass filter connected to said first enhancement conversion unit;
   a horizontal noise removal unit connected to said horizontal bandpass filter;
   a third adder connected to said vertical and horizontal noise removal units;
   a second enhancement conversion unit connected to said second adder;
   a fourth adder connected to said third adder and said second enhancement conversion unit;
   a log exposure conversion unit connected to said fourth adder;
   a density conversion unit connected to said log exposure conversion unit; and
   a thermal printer connected to said density conversion unit.

2. An apparatus, comprising:
   an electronic camera, including at least one image sensor, producing color signals;
   correction means for performing additive-type color correction processing of the color signals and subtractive-type color correction processing of the additive color corrected signals thereby producing color corrected signals, wherein said color correction means performs two dimensional low pass filtering before color correction processing and combines low pass filtered color corrected signals with high frequency color signals, and wherein said correction means performs edge enhancement of the color corrected signals prior to imprinting; and
   color image fixing means for imprinting the color corrected signals on a tangible imprinting medium.

3. An apparatus, comprising:
   an electronic camera, including at least one image sensor, producing color signals;
   correction means for performing additive-type color correction processing of the color signals and subtractive-type color correction processing of the additive color corrected signals producing color corrected signals, said color correction means comprised of:
   a) domain conversion means for converting the additive color corrected signals into log additive color corrected signals;
   b) linear color correction means for performing the additive color correction processing in a linear domain;
   c) log color correction means for performing subtractive color processing in a log domain;
   a two dimensional low pass filter, connected between said image sensor and said correction means, producing low pass filtered color signals; and
   color image fixing means for imprinting the color corrected signals on a tangible imprinting medium.

4. An apparatus as recited in claim 3, wherein said linear color correction means further comprises:
   a first adder, connected to said sensor and said low pass filter, and adding the color signals to inverted low pass filtered color signals to produce high frequency color signals;
   log-to-linear conversion means for converting log domain color corrected signals into linear color corrected signals; and
   a second adder, connected to said log-to-linear conversion means and said first adder and combining the high frequency color signals with the linear color corrected signals.

5. A method as recited in claim 4, further comprising the steps of:
   (e) performing edge enhancement of the color signals; and
   (f) combining the edge enhancement color signals with the combined color corrected and high frequency color signals.

6. An apparatus, comprising:
   an electronic camera, including at least one image sensor, producing color signals;
   correction means for performing additive-type color correction processing of the color signals and subtractive-type color correction processing of the additive color corrected signals producing color corrected signals, said correction means performing edge enhancement of the color corrected signals prior to imprinting;
   conversion means for converting the color corrected signals and one of the color signals into an enhancement domain;
   filtering means for bandpass filtering the one of the color signals;
   noise removal means for removing noise from the one of the filtered color signals;

combining means for combining the noise removed filtered color signal with the color corrected signals; and color image fixing means for imprinting the color corrected signals on a tangible imprinting medium.

7. A method of processing color signals, comprising the steps of:
  (a) performing linear space color correction of the color signals;
  (b) performing log space color correction of the color signals subsequent to the linear space correction;
  (c) splitting the color signals into low and high frequency color signals, said linear and log space correction being performed on said low frequency color signals; and
  (d) combining color corrected signals with the high frequency color signals.

* * * * *